(12) United States Patent  
Dickey

(10) Patent No.: US 9,590,520 B2
(45) Date of Patent: Mar. 7, 2017

(54) INDUCTIVE CLAMPING CIRCUIT

(71) Applicant: Hamilton Sundstrand Corporation, Windsor Locks, CT (US)

(72) Inventor: John A. Dickey, Caledonia, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 296 days.

(21) Appl. No.: 14/551,160

(22) Filed: Nov. 24, 2014

(65) Prior Publication Data

US 2016/0149505 A1    May 26, 2016

(51) Int. Cl.
  *H02M 5/293* (2006.01)
(52) U.S. Cl.
  CPC .................. *H02M 5/293* (2013.01)
(58) Field of Classification Search
  CPC ...................................... H02M 5/293
  USPC ........................................ 307/112
  See application file for complete search history.

(56) References Cited

U.S. PATENT DOCUMENTS

| 4,626,954 A | | 12/1986 | Damiano et al. | |
|---|---|---|---|---|
| 4,658,203 A | * | 4/1987 | Freymuth | H03K 17/687 257/363 |
| 5,004,969 A | * | 4/1991 | Schanin | G05F 1/455 323/235 |
| 5,629,607 A | * | 5/1997 | Callahan | H02M 1/44 323/237 |
| 5,635,826 A | * | 6/1997 | Sugawara | G05F 1/20 323/241 |
| 6,125,024 A | | 9/2000 | LeComte et al. | |
| 7,540,792 B2 | | 6/2009 | Ananthakrishnan et al. | |
| 8,847,656 B1 | | 9/2014 | A et al. | |
| 2008/0285314 A1 | * | 11/2008 | Kojori | H02M 1/32 363/37 |
| 2009/0224738 A1 | * | 9/2009 | Peto | H02M 5/293 323/282 |

FOREIGN PATENT DOCUMENTS

| EP | 2521152 | 7/2012 |
|---|---|---|
| EP | 2757688 | 7/2014 |

* cited by examiner

*Primary Examiner* — Jared Fureman
*Assistant Examiner* — Duc M Pham
(74) *Attorney, Agent, or Firm* — Carlson, Gaskey & Olds, P.C.

(57) ABSTRACT

A power control circuit includes a solid state power controller operable to connect an AC power source to a load. The solid state power controller includes a first switching device and a second switching device arranged serially. Each of the switching devices includes a diode, a controller controllably coupled to each of the first switching device and the second switching device, such that the controller is capable of controlling an on/off state of the first switching device and the second switching device. The controller further includes a non-transitory memory storing instructions for causing the controller to perform the steps of: switching off a first switching device having a diode aligned with a current polarity of an AC current flow prior to a first zero crossing, delaying a switching off of a second switching device until after the first zero crossing, and switching the second switching device off after the delay and before a second zero crossing.

16 Claims, 4 Drawing Sheets

INDUCTIVE CLAMPING CIRCUIT

TECHNICAL FIELD

The present disclosure relates generally to inductive clamping circuits, and more specifically to an inductive clamping circuit for absorbing flux energy during an inductive load switch off.

BACKGROUND

Many machines including electrical systems, such as aircraft, utilize a power distribution system to distribute AC power to one or more electronic systems within the machine. At least some of the electronic systems act as an inductive load. An inductive load creates a phase lag on current and stores energy in the inductive flux at the load. When the inductive load is switched off, any energy stored in the inductive flux at the time of the switch off must be dissipated as the flux collapses. If the inductive load is switched off at exactly the point where the AC current reverses polarity (referred to as a zero crossing), then minimal, if any, energy is stored in the inductive load resulting in a low amount of required switching dissipation. If the inductive load is not switched at the zero crossing, then significant energy can be stored within the inductive load and must be dissipated.

In systems using mechanical switches and toggles, the majority of the energy is dissipated in arcing that occurs at the switch or toggle when the physical disconnect occurs. Modern systems, however, frequently utilize solid state power controllers in place of the previous mechanical switches and toggles. When a solid state power controller is used to open (switch off) an inductive load, absent other protections, the energy is dissipated within the semiconductor device, which may be one or more metal oxide semiconductor field effect transistors (MOSFETs) contained within the solid state power controller switch. Dissipation of the stored energy within the MOSFETs can cause junction temperatures within the MOSFETs to rise rapidly and exceed the temperature design limit of the MOSFET, placing stresses on, and potentially damaging, the MOSFET.

Existing products that utilize semiconductor switching normally turn the load at approximately the current zero crossing so that the semiconductors do not have to absorb large stored energies. However, existing control methods for tracking the zero crossing result in some error in the optimum time to switch the devices off and there is residual energy left in the inductive load that still must be dissipated by the semiconductor switches. Different circuit configurations result in different error terms and different energy and heating effects on the semiconductor switches.

SUMMARY OF THE INVENTION

An exemplary method for switching off an inductive load includes switching off a first switching device having a diode aligned with a current polarity of an AC current flow prior to a first zero crossing, delaying a switching off of a second switching device until after the first zero crossing, and switching the second switching device off after the delay and before a second zero crossing.

In one exemplary embodiment a power control circuit includes a solid state power controller operable to connect an AC power source to a load. The solid state power controller includes a first switching device and a second switching device arranged serially. Each of the switching devices includes a diode, a controller controllably coupled to each of the first switching device and the second switching device, such that the controller is capable of controlling an on/off state of the first switching device and the second switching device. The controller further includes a non-transitory memory storing instructions for causing the controller to perform the steps of: switching off a first switching device having a diode aligned with a current polarity of an AC current flow prior to a first zero crossing, delaying a switching off of a second switching device until after the first zero crossing, and switching the second switching device off after the delay and before a second zero crossing.

These and other features of the present invention can be best understood from the following specification and drawings, the following of which is a brief description.

DETAILED DESCRIPTION OF AN EMBODIMENT

Figure 1:
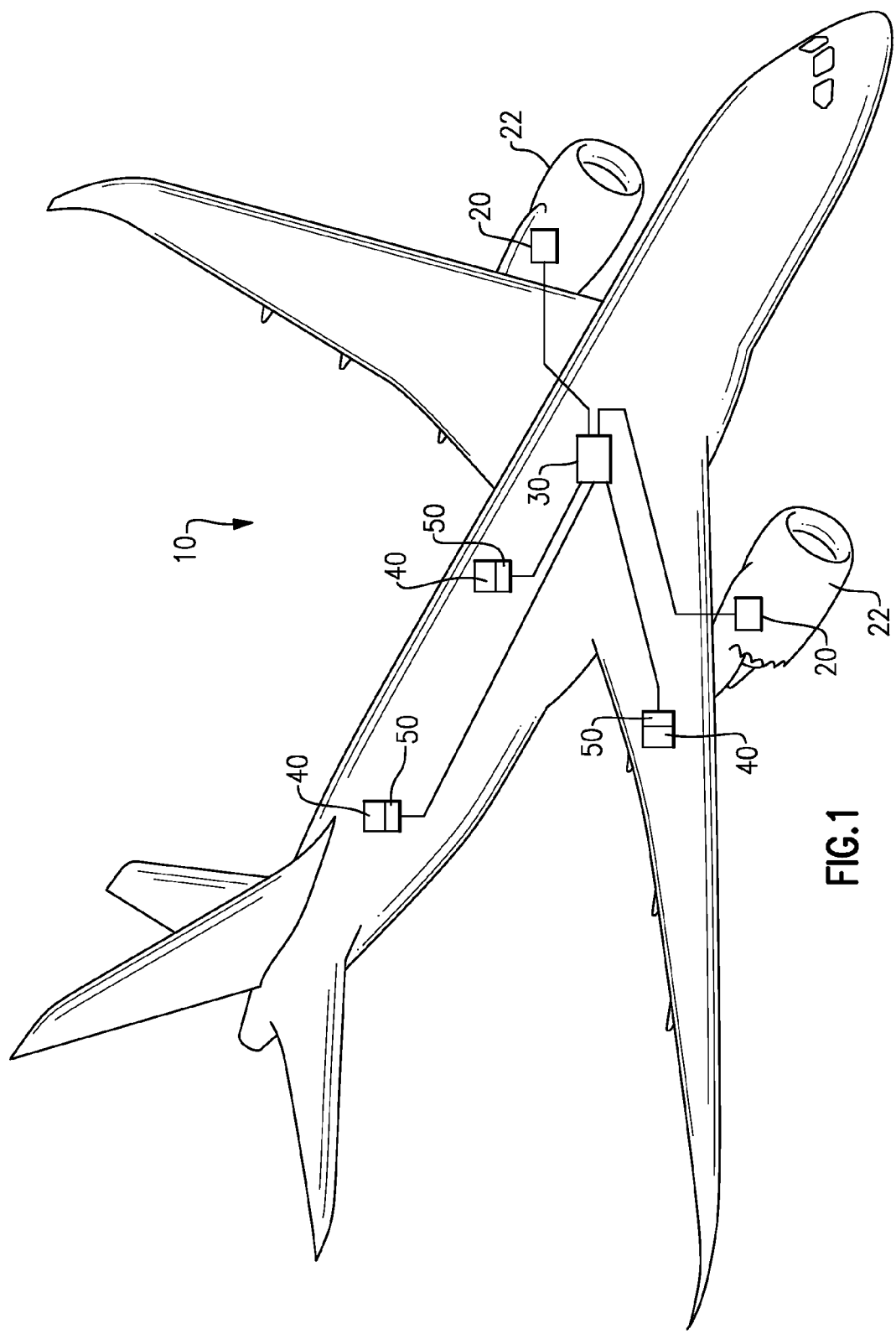
FIG. 1 schematically illustrates an exemplary aircraft.

FIG. 1 schematically illustrates an exemplary aircraft 10 including AC power generators 20. Each of the AC power generators 20 utilizes rotational motion within a gas turbine engine 22 to generate AC power. In alternative examples, the AC power can originate from, or be derived from any other on-board source. The AC power is provided to a power distribution module 30. The power distribution module 30 distributes power throughout the aircraft to various aircraft systems 40 that operate on AC power. Power flow from the power distribution unit 30 to each of the aircraft systems 40 is controlled via power controllers 50, such as solid state power controllers.

At least some of the aircraft systems 50 act as inductive loads on the power distribution system. As such, energy stored within the inductive flux must be dissipated in either the solid state power controller or in the inductive load when the inductive load is switched off.

Figure 2:
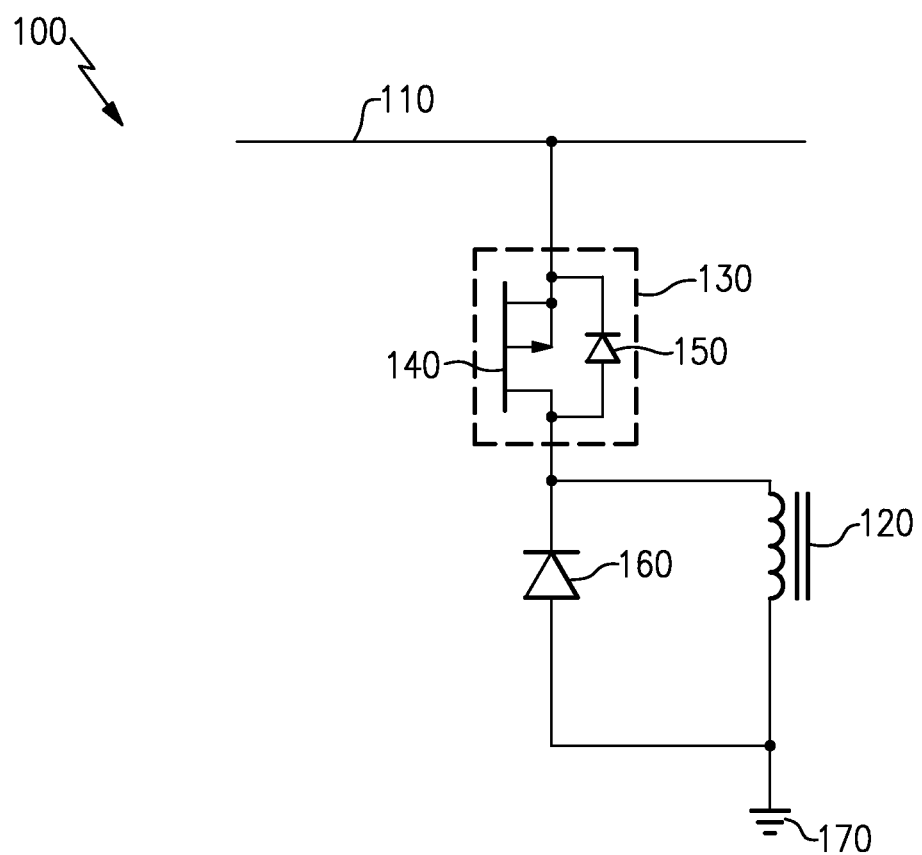
FIG. 2 schematically illustrates an exemplary circuit for controlling a DC power supply to an inductive load.

FIG. 2 schematically illustrates an exemplary circuit 100 for controlling a DC power supply 110 to an inductive load 120. A solid state power controller 130 for switching the DC power source on and off is represented as a MOSFET 140 including a body diode 150. A clamping diode 160 is connected in parallel to the inductive load 120, and the inductive load 120 and the clamping diode 160 connected the solid state power controller 130 to a ground 170 or power return line.

When the solid state power controller 130 is switched to off in a DC solid state power controller, the energy stored in the inductive flux field is reflected into the inductive load 120 and the corresponding wiring due to the presence of the clamping diode 160 (alternately referred to as a free-wheeling diode). The clamping diode allows the current to continue to flow after the solid state power controller 130 is opened and the power source 110 is removed from the inductive load 120. As a result, the energy stored in the flux field is dissipated in the wiring and in the inductive load 120, and does not cause excessive junction temperatures in the MOSFET 140 of the solid state power controller 130.

In a solid power controller controlling an AC power distribution, however, a similar energy dissipation scheme would require that the clamping diode 160 be connected in one polarity for a first half cycle of the AC signal, and then a second polarity for the second half cycle of the AC signal. By way of example, during a positive half cycle, the clamping diode 160 would be in the correct orientation, however for the negative half cycle, the connections of the clamping diode 160 would need to be reversed. There is no fixed arrangement of diodes that can perform the described DC clamping function for an AC circuit.

Figure 3:
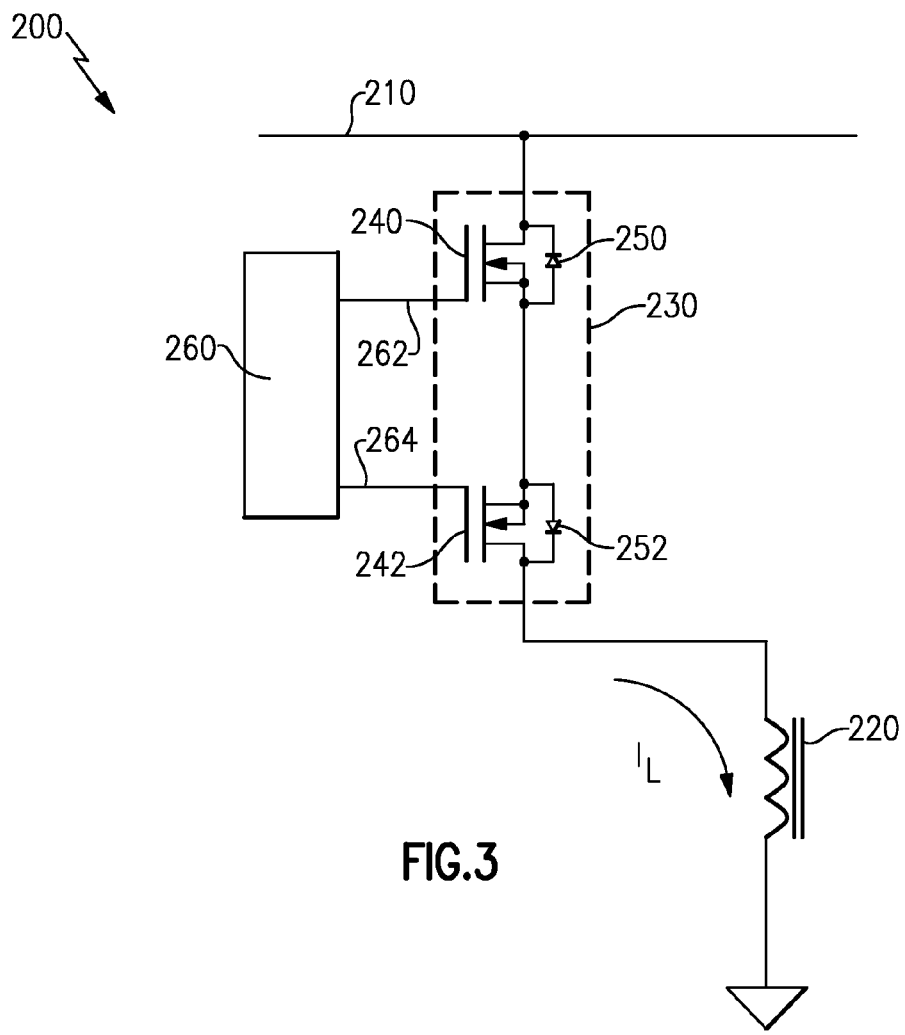
FIG. 3 schematically illustrates an exemplary circuit for controlling an AC power source to an inductive load.

FIG. 3 schematically illustrates an exemplary circuit 200 for controlling an AC power source 210 to an inductive load 220. A solid state power controller 230 connects the AC power source 210 to the inductive load 220. Within the solid state power controller 230 are two sequentially arranged transistors 240, 242, such as MOSFETs. Each of the transistors 240, 242 includes a body diode 250, 252. The body diodes 250, 252 of each of the transistors 240, 242 are oriented in reverse polarity relative to each other, with the first body diode 250 being aligned with a first half cycle of the AC signal, and the second body diode 252 being aligned with the second half cycle of the AC signal. A controller 260 provides individual on/off controls to each of the transistors 240, 242 in the solid state power controller 230 using independent control signals 262, 264. By utilizing independent control signals 262, 264, the controller 260 is able to independently switch the transistors 240, 242 on and off, without affecting the other of the transistors 240, 242. The controller 260 can be a digital controller, a hardware based current generator, or any other suitable transistor controller.

In order to prevent flux energy from being dissipated in the junctions of the transistors 240, 242, controller 260 switches off the transistor 240, 242 whose body diode is aligned with the present current polarity, and leaves the other transistor 240, 242 on for a delay period. During the delay period the body diode 250, 252 of the on transistor 240, 242 acts as a free-wheeling diode and allows the flux energy to dissipate in the wiring and in the inductive load 220 naturally.

The initial transistor 240, 242 that is switched off is selected by the controller 260 depending on the present polarity of the AC line 210 at the time the circuit is desired to be turned off. This causes the acting free-wheeling diode to be dependent upon the present half cycle. This, in turn, allows the clamping capability described above with regards to the DC circuit 100 (illustrated in FIG. 2) to be maintained by selectively connecting only the body diode 250, 252 that is the correct polarity for each phase of the AC cycle during turnoff.

Figure 4:
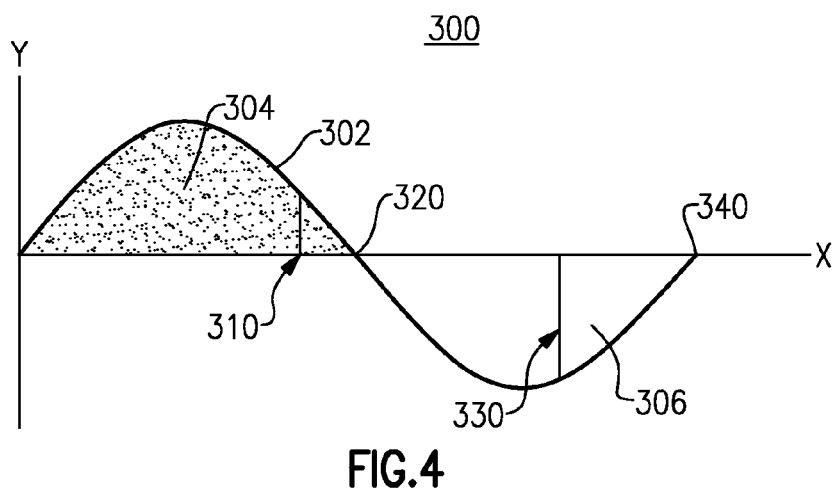
FIG. 4 schematically illustrates a switch timing chart for the exemplary circuit of FIG. 3.
Figure 5:
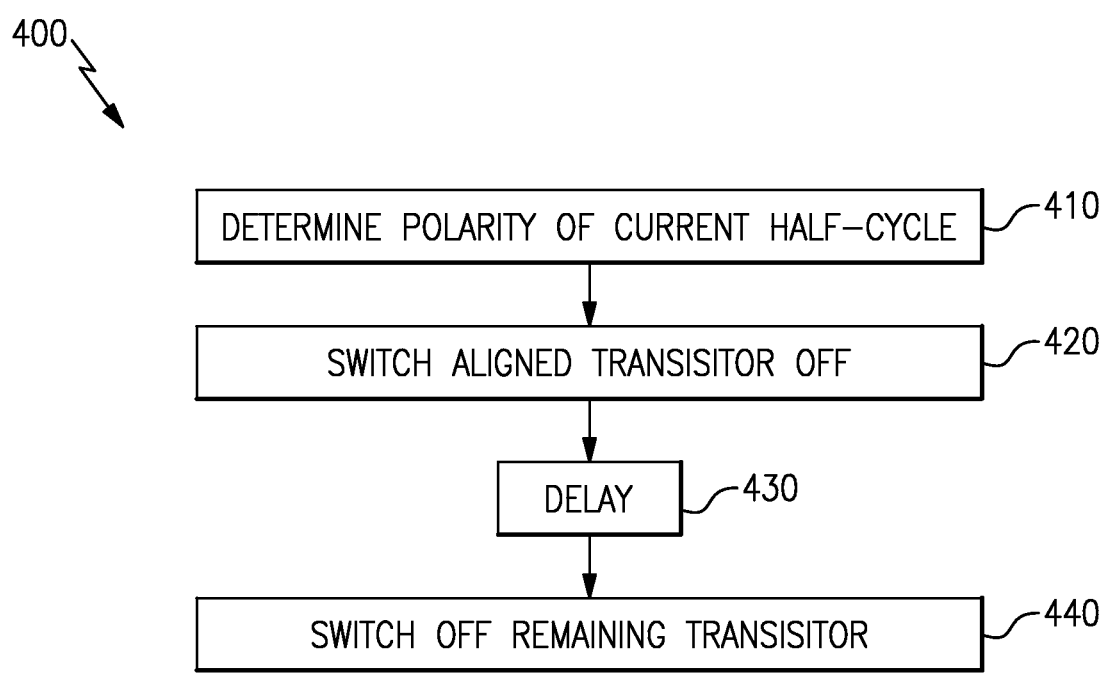
FIG. 5 illustrates a flowchart demonstrating a solid state power controller switching process from the perspective of a controller.

FIG. 4 illustrates an example switch timing diagram 300, with the x axis representing time, and the y axis representing current magnitude. In the example of FIG. 4, the above described sequential switching is achieved by first turning off the MOSFET 240, 242 that has a body diode 250, 252 aligned with the current polarity of the AC current, at a point in time 310 prior to a zero crossing 320. The other MOSFET 240, 242 is left on for a delay period that encompasses the zero crossing 320. After the delay period has elapsed, and after the first zero crossing 320 has passed, the other MOSFET 240, 242 is switched off at a second switching time 330.

The second switching time 330 occurs significantly after the first zero crossing and significantly before a second zero crossing 340 immediately following the first zero crossing 320. In some examples, the second switch time 330 occurs at 90 degrees in the phase of the AC current. The sequential switch timing allows the present current to continue flowing through the inductive load using the body diode 250, 252 of the switched off MOSFET 240, 242 until the end of the current half cycle 304 of the AC current. The current flow then naturally stops at exactly the first zero crossing 320. Since the MOSFET 240, 242 that would normally allow the polarity of the second half cycle to flow is already switched off prior to the first zero crossing 320, current in the second half cycle 306 does not start flowing during any portion of the second half cycle 306.

In some alternative examples of the AC switching circuit 200 and the switching process described above with regards to FIGS. 3 and 4, the controller 260 also includes a fault detection element. The fault detection element can be any suitable fault detection system. The fault detection element is able to detect and respond to a short circuit, or other type of fault within the load or the connection to the load. Typically, fault detection elements respond by disconnecting the AC current source form the inductive load. In such a case the sequential switching process described above is bypassed and both transistors 240, 242 are switched simultaneously in order to prevent the fault current from being transmitted through the load 220.

With continued reference to FIGS. 1-4, FIG. 5 illustrates a flowchart demonstrating a solid state power controller switching process 400 from the perspective of a controller 260. When an initial determination to switch a corresponding inductive load off is made by the controller 260, the controller 260 determines the current polarity of the AC current in a "Determine Polarity of Current Half-Cycle" step 410. Based on the current polarity of the present half cycle, the controller 260 then determines which transistor 240, 242 includes a body diode 250, 252 aligned with the current polarity, and switches the aligned transistor 240, 242 off in a "Switch Aligned Transistor Off" step 420.

Once the aligned transistor 240, 242 is switched off, the controller 260 delays a switching off of the unaligned transistor 240, 242 for a predetermined time period in a "Delay" step 430. In some examples, the length of the delay is a fixed delay designed to guarantee that the following step is performed significantly after the next zero crossing 320, and significantly before the zero crossing 340 immediately following the next zero crossing 320. In alternative examples, the controller 260 can dynamically determine the required length of the delay such that the process 400 switches the second transistor 240, 242 off at a desired point in the second half cycle 306. By way of example, in some systems the point in the second half cycle 306 is ninety degrees. In an alternative example, the controller 260 can determine when the current has stopped flowing into the load. The controller 260 then turns off the second transistor 240, 242 at a relatively short time period after the current has stopped flowing. After the delay has elapsed, the controller 260 switches off the remaining transistor 240, 242 in a "Switch Off Remaining Transistor" step 440.

As described above, the current is allowed to continue to flow through the body diode 250, 252 of the aligned transistor 240, 242 until the first zero crossing 320, after which the current is blocked by the body diode 250, 252 and the turned off transistor 240, 242. This effect causes the power to the inductive load 220 to be disconnected at the zero crossing 320, thereby dramatically reducing, or minimizing the peak magnitude of the electrical energy dissipated in the junctions of the transistors 240, 242 at the time the load is switched off.

While illustrated and described above as single transistors in a solid state power controller, one of skill in the art having the benefit of this disclosure will understand that the transistors described can be transistor networks including multiple similar aligned transistors, and switching off one transistor entails switching off all similarly aligned transistors in the transistor networks.

In further alternative examples, non-MOSFET transistors or other switching devices including a bipolar transistor can be utilized in place of the above described MOSFET transistors 240, 242. Further, one of skill in the art having the benefit of this disclosure will recognize that the clamping diodes can, in some examples, be external diodes corresponding to a given switching device and are not required to be body diodes of a transistor or other switching device.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for switching off an inductive load comprising:
    switching off a first switching device having a diode aligned with a current polarity of an AC current flow prior to a first zero crossing;
    delaying a switching off of a second switching device until after said first zero crossing; and
    switching the second switching device off after said delay and before a second zero crossing.

2. The method of claim 1, wherein each of said first switching device and said second switching device is a MOSFET.

3. The method of claim 1, wherein there are no intervening zero crossings between the second zero crossing and the first zero crossing.

4. The method of claim 1, wherein switching off a first switching device having a diode aligned with a current polarity of an AC current flow prior to a first zero crossing comprises causing a diode of the first switching device to operate as a freewheeling diode, thereby allowing current in the inductive load to continue to flow.

5. The method of claim 1, wherein switching the second switching device off after said delay and before a second zero crossing occurs when a half cycle of the AC current is approximately 90 degrees past the first zero crossing.

6. The method of claim 1, further comprising determining a current polarity of an AC current flowing into an inductive load prior to switching off the first switching device.

7. The method of claim 6, wherein determining a current polarity of an AC current flowing into an inductive load prior to switching off the first switching device further comprises determining a corresponding switching device having an aligned diode.

8. The method of claim 1, wherein delaying a switching off of a second switching device until after said first zero crossing comprises delaying switching of the second switching device for one of a predetermined period of time period and a time period defined as elapsing when the current has completely stopped flowing.

9. The method of claim 1, wherein delaying a switching off of a second switching device until after said first zero crossing comprises determining a required delay length such that said switching the second switching device off after said delay and before a second zero crossing occurs between the first zero crossing and the second zero crossing.

10. The method of claim 1, wherein switching off a first switching device having a diode aligned with a current polarity of an AC current flow prior to a first zero crossing further comprises switching off a second switching device having a diode unaligned with a current polarity of an AC current flow when a load fault is detected, thereby bypassing the steps of delaying a switching off of a second switching device until after said first zero crossing, and switching the second switching device off after said delay and before a second zero crossing.

11. A power control circuit comprising:
    a solid state power controller operable to connect an AC power source to a load, wherein the solid state power controller includes a first switching device and a second switching device arranged serially and wherein each of said switching devices includes a diode,
    a controller controllably coupled to each of said first switching device and said second switching device, such that said controller is capable of controlling an on/off state of said first switching device and said second switching device;
    said controller further including a non-transitory memory storing instructions for causing the controller to perform the steps of:
    switching off a first switching device having a diode aligned with a current polarity of an AC current flow prior to a first zero crossing;
    delaying a switching off of a second switching device until after said first zero crossing; and
    switching the second switching device off after said delay and before a second zero crossing.

12. The power control circuit of claim 11, wherein said controller is a component of said solid state power controller.

13. The power control circuit of claim 11, wherein said controller is an independent controller.

14. The power control circuit of claim 11, wherein said first switching device is a MOSFET and said second switching device is a MOSFET.

15. The power control circuit of claim 11, wherein said first switching device is a MOSFET transistor network and said second switching device is a MOSFET transistor network.

16. The power control circuit of claim 11, further comprising an AC power source connected to said solid state power controller, such that said solid state power controller is operable to control a flow of AC power from said AC power source to a load connected to the solid state power controller.

* * * * *